United States Patent Office 2,797,999
Patented July 2, 1957

2,797,999
BIOCIDAL CEMENTITIOUS STRUCTURES AND METHODS OF PREPARING THEM

Alexander Klein, Danville, Calif., assignor to Kalman Floor Company, Incorporated, New York, N. Y., a corporation of Delaware No Drawing. Application December 27, 1950, Serial No. 203,027

6 Claims. (Cl. 106—15)

This invention relates to disinfecting and sterilization, and has for its general object the provision of novel and improved ways and means for providing biocidal and bactericidal building materials, particularly those providing exposed interior wall portions of building structures, for example, structures to be used as hospitals, nurseries, or food manufacturing or processing establishments such as bakeries, dairies, or the like.

The health departments of most cities, and of other political sub-divisions, have set up rigid requirements regarding sanitation in buildings in which food is handled or processed and one of the more important regulations is that which requires that the walls and floors be washed down periodically with a biocidal solution of proper concentration and effectiveness.

There are certain quite obvious difficulties attendant upon such periodic washing or spraying. In addition to the labor and expense of these frequent applications, there is the danger of contamination of the food products or raw materials with the disinfecant used, and the necessity of shifting supplies and equipment about with consequent loss of time and delay in production.

In view of these premises, it has heretofore been proposed to incorporate in the cementitious wall construction or wall covering material, a disinfectant agent which it was hoped would provide a permanent disinfectant action. However, such prior proposals have contemplated the addition of relatively large percentages of the disinfectant (from 0.1% to 4.0% by weight of cement) which not only adds to the expense of the preparation but also introduces the possibility of weakening or otherwise adversely affecting the concrete, plaster, stucco, or other wall material.

It is therefore an object of the present invention to provide a cementitious wall or floor mix containing very minute quantities of disinfecant which cannot adversely affect the material in any way and which will provide a persistent, continuous, and inexpensive means for permanently disinfecting the walls of sanitary structures when they are built.

More specifically, it is an object of the invention to provide a cement, concrete, stucco, plaster, or topping mixture containing as little as 0.0001 percent of disinfectant by weight of the cement used.

Another feature of the invention is the provision of a new biocidal or bactericidal cementitious mix containing precipitated metallic silver and/or organic and inorganic compounds of silver, preferably in the colloidal state.

Specific examples of the relatively water-insoluble agents which may be used in accordance with the invention are precipitated metallic silver; silver chloride; Silvol, a colloidal silver-alkaline protein compound containing about 20% silver; Neo-Silvol, a compound of Silvol containing about 18% to 22% colloidal silver iodide; and Collargol (Collargolum), a colloidal silver and silver oxide compound formed by reduction and stabilized by egg albumen, and containing approximately 80% silver.

These materials are mixed with the topping mixtures, the concrete used in wall or floor constructions, the wall coating materials such as stucco, plaster, plaster board, or the like, or if preferred, they may be mixed with the Portland or hydraulic cement before the concrete or other mixes are prepared.

Tests have shown that concretes containing as little as 0.0001% of these disinfectant agents by weight of the cement are rendered effectively germicidal over an extended period of time. The addition of as much as 0.0005% is extremely effective and the cost still negligible; and as much as 0.005% by weight of the cement may be employed without deleterious effect on the strength and wearing properties of the building material.

Comparative tests of the effectiveness of these agents and of the well-known germicidal solution Roccal have been made and the results of some of these experiments are set forth below. Roccal is widely employed in the periodic washing down of walls and floors of hospitals and food processing establishments. This composition is used in the form of an aqueous solution and the active ingredient is understood by the applicant to be a high molecular alkyldimethyl benzyl-ammonium chloride (benzalkanium chloride). The high molecular alkyl group consists of a mixture of alkyl radicals from $C_8H_{17}$ to $C_{18}H_{37}$ as contained in the corresponding fatty acids of cocoanut oil. The phenol coefficient is stated to be 25 for *E. typhosa* at 20° C. While Roccal is a highly effective bacteriological agent for short periods following its application, it has been found that this compound, as well as other water-soluble agents, when incorporated in concrete is subject to the leaching action of repeated washings of the concrete surfaces and is therefore not a permanent bactericidal agent under conditions normally obtaining in buildings where the floors or walls are periodically washed.

These tests are described and some of the results set forth below:

The test specimens were 6 square inch samples of a regular 1 inch thick floor topping which were cut from larger panels. The bactericidal compounds were added at the time of mixing. Two different concentrations were used in the tests described, namely, 0.0005% by weight of the cement and the relatively low concentration of 0.0001% by weight of the cement. For control purposes, specimens were also made up to which no bactericidal addition was made.

The specimens were cured in fog to the age of three months. The testing procedure was as follows:

1. The test specimens were sterilized.

2. Bacteriological cultures were placed on each test specimen, in like amounts.

3. After periods of 24, 60, and 288 hours, living organisms were harvested by systematic scraping and preparing the scrapings for counting.

4. An accounting of the living organisms was made.

The results of the exploratory tests are shown in the attached table. Considering *Staphylococcus aureus,* which is a fairly hardy germ, it will be noted that precipitated silver metal was a very effective germicidal agent, and all of the silver compounds are quite effective in hastening the death of Staphylococcus.

*Comparative effectiveness of bactericidal compounds incorporated in concrete*

[Specimens cured in fog for three months.]

| Bactericidal Compound | | Staphylococcus Aureus Living Organisms Recovered After Exposure Time of— | | |
|---|---|---|---|---|
| Type | Amount, percent by wt. of cement | 24 hr. | 60 hr. | 288 hr. |
| None | | 550,000 | 24,000 | 10,000 |
| Neo Silvol | 0.0005 | 100,000 | 17,400 | None |
| Collargolum | 0.0005 | 500,000 | None | None |
| Precipitated silver metal | 0.0005 | 3,000 | 400 | None |
| Bacteriological Test Conditions | | Cultures exposed at room temperatures. 1,520,000 organisms planted. Culture area 2.27 sq. cm. Organisms suspended in 0.85% saline solution. | | |

The tests on washed samples of concrete containing bactericidal agents are described as follows:

above, the concentration of bactericidal agents contained in the concrete was only one-fifth, or 0.0001 percent by weight of cement in the case of the silver salts and silver metal, and 0.01 percent by weight of cement in the case of the Roccal reagent.

The bacteria used in the tests on washed samples consisted in an initial concentration of 10,000,000 *E. coli* for each specimen. A nutrient, tryptose phosphate broth, was used to start the test, and additional nutrient added before each count. The results of counts are shown in the table below.

The order of effectiveness of the various bactericides after an exposure time of seven days was found to be: (1) precipitated silver; (2) Neo Silvol; (3) Silvol; (4) Roccal; (5) Collargolum; and (6) untreated.

After seven days of exposure of the repeatedly washed specimens, the precipitated silver was approximately 250 times as effective, and the Neo Silvol and Silvol were 8 or 9 times as effective, as the Roccal, even though the original concentration of the Roccal was 100 times as great as that of these other materials.

Further tests were made on specimens or test samples which were cured in the fog room for a period of 30 months. These samples were 2 inches by 2 inches and 1 inch thick and were representative of heavy-duty concrete floor toppings commonly found in industrial plants. The concrete mix was composed of 1 part of cement to 3 parts of sand and fine gravel, to which there were added the bactericidal agents in the percentages shown in the table below. The samples were stored in the fog room, so that their surfaces were continually moist, for a period of 30 months before the beginning of the bactericidal tests. These tests were made on the specimens without scrubbing them as in the case of the previously described test. After removal of the specimens from the fog room, they were sterilized by exposure to ultra violet

*Comparative effectiveness of bactericidal compounds incorporated in concrete, using bacterial organism* E. coli *and tryptose phosphate nutrient broth*

[Washed specimens.]

| Bacterial Compound | | Living Organisms Recovered After Exposure Time of— | | | |
|---|---|---|---|---|---|
| Type | Amount, percent by wt. of cement | 0 Hr. | 24 hr. (1 day) | 72 hr. (3 days) | 168 hr. (7 days) |
| None | | 10,000,000 | 320,000,000,000 | 800,000,000,000 | 6,400,000,000 |
| Neo Silvol | 0.0001 | 10,000,000 | 72,300,000,000 | 570,000,000,000 | 42,000,000 |
| Silvol | 0.0001 | 10,000,000 | 260,000,000,000 | 300,000,000,000 | 48,000,000 |
| Collargolum | 0.0001 | 10,000,000 | 190,000,000,000 | 260,000,000,000 | 2,600,000,000 |
| Precipitated silver metal | 0.0001 | 10,000,000 | 52,000,000,000 | 65,000,000,000 | 1,540,000 |
| Roccal | ª Approx. 0.01 | 10,000,000 | 16,600,000,000 | 190,000,000,000 | 380,000,000 |

Note:
At 360 hr. (15 days) exposure there were no living organisms with any bacterididal compound.
Cultures were exposed at room temperatures with nutrient of Tryptose Phosphate broth.
1 cc. nutrient furnished to each sample prior to count.
ª Concentration: 1 part Roccal solution (50%) in 2500 parts of mixing water. Approximately 0.01% by weight of cement.

These samples were treated preliminary to tests of bactericidal effectiveness, in such manner as to simulate the effects of weekly washing of a concrete floor over a period of one year. As compared to samples described light and then inoculated with 2 ml. of *E. coli* in a nutrient broth. The initial concentration of *E. coli* was 10,000,000. The specimens were thereafter placed in an incubator at 37° C. and microscopic counts of living organisms were made after 24, 72, and 168 hours. The results are set forth in the following table:

*Comparative effectiveness of bactericidal compounds incorporated in concrete, using bacterial organism E. coli and tryptose phosphate nutrient broth*

[Specimens cured in fog for 30 months with no scrubbing.]

| Bacterial Compound | | Living Organisms Recovered After Exposure Time of— | | | |
|---|---|---|---|---|---|
| Type | Amount, percent by wt. of cement | 0 Hr. | 24 hr. (1 day) | 72 hr. (3 days) | 168 hr. (7 days) |
| None | | 10,000,000 | 228,000,000,000 | 73,000,000,000 | 5,030,000,000 |
| Neo Silvol | 0.0001 | 10,000,000 | 80,000,000,000 | 63,000,000,000 | 630,000,000 |
| Precipitated silver metal | 0.0001 | 10,000,000 | 115,000,000,000 | 1,400,000,000 | 650,000,000 |
| Roccal | *0.01 | 10,000,000 | 173,000,000,000 | 42,000,000,000 | 6,200,000,000 |

*Concentration: 1 part Roccal solution (50%) in 2500 parts of mixing water.

Note:
All values for living organisms recovered are averages for duplicate tests.
At 432 hr. (18 days) exposure there were no living organisms remaining on any specimen containing a bactericidal compound.

It will be observed that in the foregoing test, the Neo Silvol and the precipitated silver metal, even in the minute amounts of 0.0001 percent by weight of the cement, were highly effective in their bactericidal action. Although Roccal was employed in an amount 100 times as great as Neo Silvol or precipitated silver metal, the number of living organisms recovered from Roccal-treated specimens were not much different from the numbers recovered from the specimens containing no bactericide.

It is understood that as employed in the present specification and claims, the term "walls" is used in a generic sense and includes not only the side walls of enclosures, but the floors and ceilings as well; and may also be considered as including any fixtures or installations made of or coated with cementitious compositions.

Having thus described the invention, what is claimed as new and desired to be secured by Letters Patent is:

1. A cementitious building material mix for wall constructions and wall coverings for sanitary enclosures and the like which comprises an inorganic cementitious material, water, and a biocidal ingredient selected from the group consisting of silver and silver salts, said ingredient being present in an amount from about 0.0001% to about 0.005% by weight of said cementitious material.

2. A cementitious building material mix for wall constructions and wall coverings for sanitary enclosures and the like which comprises an inorganic cementitious material, water, and a biocidal ingredient selected from the group consisting of silver and silver salts, said ingredient being present in an amount from about 0.0001% to about 0.0005% by weight of said cementitious material.

3. The composition of claim 1 wherein said biocidal ingredient is precipitated silver.

4. The composition of claim 1 wherein said biocidal ingredient is a colloidal silver-alkaline protein compound containing about 20% silver.

5. The composition of claim 1 wherein said biocidal ingredient is a colloidal silver-alkaline protein compound containing about 20% silver, to which has been added from about 18% to 22% colloidal silver iodide.

6. The composition of claim 1 wherein said biocidal ingredient is a compound of colloidal silver and silver oxide stabilized by egg albumen.

References Cited in the file of this patent

UNITED STATES PATENTS

| | | |
|---|---|---|
| 756,798 | Pierce | Apr. 5, 1904 |
| 1,421,914 | Coleman | July 4, 1922 |
| 1,642,511 | Sanders | Sept. 13, 1927 |
| 1,818,184 | Work | Aug. 11, 1931 |
| 2,008,131 | Dieck et al. | July 16, 1935 |
| 2,040,806 | Feigl | May 12, 1936 |
| 2,072,809 | Bley | Mar. 2, 1937 |
| 2,439,441 | Amberg et al. | Apr. 13, 1948 |
| 2,627,476 | Herndon | Feb. 3, 1953 |